United States Patent [19]

Yamao

[11] Patent Number: 5,604,287
[45] Date of Patent: Feb. 18, 1997

[54] POLYARYLENE SULFIDE RESIN COMPOSITION

[75] Inventor: Shinobu Yamao, Ichihara, Japan

[73] Assignee: Idemitsu Petrochemical Co., Ltd., Tokyo, Japan

[21] Appl. No.: 545,571

[22] PCT Filed: Mar. 16, 1995

[86] PCT No.: PCT/JP95/00443

§ 371 Date: Nov. 17, 1985

§ 102(e) Date: Nov. 17, 1985

[87] PCT Pub. No.: WO95/25142

PCT Pub. Date: Sep. 21, 1995

[30] Foreign Application Priority Data

Mar. 17, 1994 [JP] Japan .................. 6-72701

[51] Int. Cl.[6] .................................. C08K 3/34
[52] U.S. Cl. ................. 524/493; 524/502; 524/504; 524/506; 524/609
[58] Field of Search ...................... 524/493, 502, 524/504, 506, 609

[56] References Cited

U.S. PATENT DOCUMENTS

| | | | |
|---|---|---|---|
| 4,370,292 | 1/1983 | Yanase et al. | 525/537 |
| 4,748,169 | 5/1988 | Izutsu et al. | 524/504 |
| 5,011,887 | 4/1991 | Sasaki et al. | 525/63 |
| 5,110,861 | 5/1992 | Togami et al. | 524/588 |
| 5,230,953 | 7/1993 | Tsugeno et al. | 524/493 |
| 5,248,730 | 9/1993 | Yamao | 525/122 |
| 5,409,996 | 4/1995 | Shinohara et al. | 525/537 |

FOREIGN PATENT DOCUMENTS 02-127471  5/1990  Japan .

*Primary Examiner*—Mark D. Sweet
*Attorney, Agent, or Firm*—Oblon, Spivak, McClelland, Maier & Neustadt, P.C

[57] ABSTRACT

A polyarylene sulfide resin composition comprising (A) a polyarylene sulfide resin, (B) silica, (C) (cl) a terpolymeric elastomer made from ethylene, an $\alpha$, $\beta$-unsaturated carboxylate, and maleic acid anhydride and/or (c2) a graft composite elastomer which is a vinyl monomer grafted composite elastomer of polyorganosiloxane and alkyl (meth)acrylate, and (D) a mercaptosilane coupling agent, at a specific proportion. The composition exhibits superior mechanical strength and high fluidity and can be used effectively for sealing ICs and various electronic parts.

5 Claims, No Drawings

POLYARYLENE SULFIDE RESIN COMPOSITION

FIELD OF THE INVENTION

The present invention relates to a polyarylene sulfide resin composition ("polyarylene sulfide" may be hereinafter referred to as "PAS"), and, more particularly, to a PAS resin composition which exhibits superior mechanical strength and high fluidity and can be used effectively for sealing ICs and various electronic parts.

BACKGROUND OF THE INVENTION

Generally, the characteristics required for resin compositions used as a sealing material for ICs and the like include (1) a low melt viscosity sufficient for the resin composition to be molded without cutting or deforming bonding wires for elements and (2) a coefficient of linear expansion close to metals. The coefficient of linear expansion has conventionally been adjusted by the addition of a large amount of fillers. The fillers, however, can be added to the resin composition only with decrease in the mechanical strength.

Because of this, thermoset resins, such as epoxy resins and silicone resins, have been used heretofore. However, because the thermoset resins can be manufactured only with a low productivity, spur runners of thermoset resins cannot be reused, and thermoset resins cannot be easily recycled, a great attention has been given to thermoplastic resins. Among thermoplastic resins, polyarylene sulfide (PAS) and polyphenylene sulfide (PPS) are considered to be particularly promising sealing materials due to their superior heat resistant and flame retarding characteristics.

The following compositions have been proposed as the composition using the PAS.

(1) A composition with a silane coupling agent added to improve the characteristics (Japanese Patent Publication (kokoku) No. 18351/1993).

(2) A composition with an olefin copolymer made from αolefin and α, β-unsaturated glycidyl ester added to PAS (Japanese Patent Application Laid-open (kokai) Nos. 17594/1988 and 68101/1991).

(3) A composition with an ethylenic copolymer elastomer added to an aminated PPS (Japanese Patent Application Laid-open (kokai) No. 153262/1992).

(4) A composition comprising PPS, an ethylenic terpolymeric elastomer, and a silane coupling agent (Japanese Patent Application Laid-open (kokai) No. 202245/1993).

The composition (1) exhibits only insufficient improvement in the toughness and fluidity. A large amount of the hydrogenated SBS must be added to the composition (2), giving rise to poor heat resistance and chemical resistance. The composition (3) has poor fluidity because of the large molecular weight of the PPS and is thus not suitable as a sealing material. The composition (4) was invented in order to improve the mechanical strength of PPS without regard to the viscosity, of which the reduction is important for a composition used as a sealing material. The silane coupling agents disclosed accompany an increase in the viscosity and are not desirable. These compounds are therefore not necessarily satisfactory.

The present invention was accomplished in view of this situation and has an object of providing a polyarylene sulfide resin composition which exhibits superior mechanical strength and high fluidity and can be used effectively for sealing ICs and various electronic parts.

DESCRIPTION OF THE INVENTION

The above object can be achieved by the present invention by a polyarylene sulfide resin composition comprising:

(A) a polyarylene sulfide resin, (B) silica, (C) (c1) a terpolymeric elastomer made from ethylene, an α, β-unsaturated carboxylate, and maleic acid anhydride and/or (c2) a graft composite elastomer which is a vinyl monomer grafted composite elastomer of polyorganosiloxane and alkyl (meth)acrylate, and (D) a mercaptosilane coupling agent, and wherein the amounts of components (A), (B), (C) and (D) satisfy the following inequalities (I) to (IV), $$0.15 \leq A/(A+B+C) \leq 0.60 \quad \text{(I)},$$

$$0.40 \leq B/(A+B+C) \leq 0.85 \quad \text{(II)},$$

$$0.03 \leq C/A \leq 0.30 \quad \text{(III)},$$

and $$0.001 \leq D/(A+B+C) \leq 0.05 \quad \text{(IV)}.$$

In a preferred embodiment of the present invention, said polyarylene sulfide resin (A) has a melt viscosity of 3–30 Pa·S at the resin temperature of 300° C. and the shear rate of 200 $S^{-1}$.

In another preferred embodiment of the present invention, the sodium content in said polyarylene sulfide resin (A) is 150 ppm or smaller.

In still another preferred embodiment of the present invention, the silica (B) is melt silica and/or crystalline silica having an average particle diameter of 50 μm or smaller.

In a further preferred embodiment of the present invention, the monomer composition in said terpolymeric elastomer (c1) is 50–90% by weight of ethylene, 5–49% by weight of an α, β-unsaturated carboxylate, and 0.5–10% by weight of maleic acid anhydride; the elastomer composition in said composite elastomer of said graft composite elastomer (c2) is 1–99% by weight of polyorganosiloxane and 99–1% by weight of alkyl (meth)acrylate; and said graft composite elastomer (c2) is made up of 30–95% by weight of the composite elastomer and 5–70% by weight of the vinyl monomer.

In a still further preferred embodiment of the present invention, said mercaptosilane coupling agent (D) contains one or more —SH group and one or more Si—OR group, wherein R is an alkyl group.

Each component of the polyarylene sulfide resin composition of the present invention will now be illustrated.

1. Polyarylene sulfide resin (A)

The compounds which are represented by formula —(Ar—S—)$_n$ and known per se in the art can be given as the polyarylene sulfide resin (A) used in the present invention. In the above formula, —Ar— is a divalent aromatic group which contains at least one 6 carbon ring, which may optionally have substituted groups, such as atoms, e.g. halogen atoms (F, Cl, Br, etc.), or other groups such as alkyl group (e.g. methyl group), nitro group, carboxylic acid group or a salt thereof, amino group, and phenyl group. The following groups are given as examples of —Ar—.

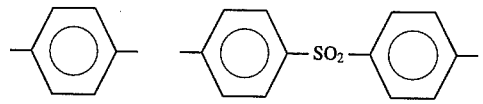

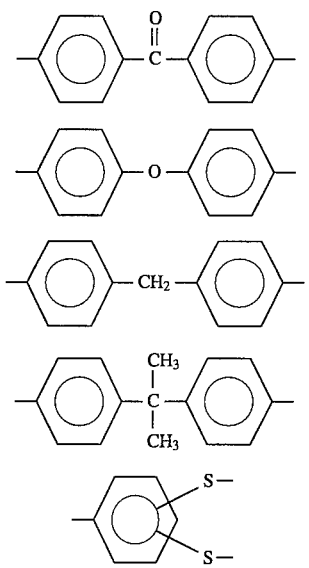

Among the polyarylene sulfide resins, those not cross-linked or partially cross-linked are preferred because of the small viscosity change by temperatures.

The PAS resin (A) has a melt viscosity of 3–30 Pa·S, preferably 4–20 Pa·S, at the resin temperature of 300° C. and the shear rate of 200 $S^{-1}$.

If the melt viscosity is smaller than 3 Pa·S, the mechanical strength is poor. The melt viscosity higher than 30 Pa·S may cause bonding wires to be deformed during forming.

The sodium content of the PAS resin is preferably 150 ppm or less, and more preferably 100 ppm or less. If the sodium content is greater than 150 ppm, metallic parts in elements such as ICs may be corroded and may decrease the reliability of such elements.

The proportion of the PAS resin (A) to be incorporated in the composition of the present invention is 15–60% by weight, preferably 20–50% by weight, of the total amount of the PAS resin (A), silica (B), and the ethylenic terpolymeric elastomer (C).

If this proportion is less than 15% by weight, the fluidity of the resulting composition is decreased; if more than 60% by weight, the resin composition has a large coefficient of linear expansion and may impair the reliability of the elements.

2. Silica (B)

Silica (B) is used in the present invention to keep rigidity and to adjust the coefficient of linear expansion. Either melt silica or crystalline silica, or a mixture of these, may be used as the silica (B) in the present invention. The surface of silica (B) may be treated with epoxy silane, amino silane, or other silane coupling agent to the extent that the effect of the mercaptosilane coupling agent, which is hereinafter discussed, is not adversely affected.

The silica (B) has an average particle diameter preferably of 50 μm or less, and particularly preferably 35 μm or less. If the particle diameter of silica (B) is more than 50 μm, the reliability of the element may be impaired.

The sodium content of the silica (B) is preferably 5 ppm or less, and more preferably 3 ppm or less. If the sodium content is greater than 5 ppm, sodium ion ($Na^+$) may enter the elements and may decrease the reliability of such elements.

The proportion of the silica (B) to be incorporated in the composition of the present invention is 40–85% by weight, preferably 50–80% by weight, and particularly preferably 50–60% by weight, of the total amount of the PAS resin (A), the silica (B), and the ethylenic terpolymeric elastomer (C).

If this proportion is less than 40% by weight, the resin composition has a large coefficient of linear expansion, which may impair the reliability of the elements. If more than 85% by weight, the fluidity of the resulting composition may be decreased.

3. Ethylenic terpolymeric elastomer and/or graft composite elastomer (C)

The elastomer (C) is used in the present invention to increase adhesiveness of the resin to the elements and to improve toughness of the resin composition. This elastomer (C) is (c1) a terpolymeric elastomer made from ethylene, an α, β-unsaturated carboxylate, and maleic acid anhydride or (c2) a graft composite elastomer which is a vinyl monomer grafted composite elastomer of polyorganosiloxane and alkyl (meth)acrylate, or a combination of (c1) and (c2).

As the α, β-unsaturated carboxylate, alkyl esters of an unsaturated carboxylic acid having 3–8 carbon atoms, such as acrylic acid or methacrylic acid, are preferred. Among them, ethyl acrylate, t-butyl acrylate, and methyl methacrylate are particularly preferred.

The monomer composition in the ethylenic elastomer (C) is 50–90% by weight, preferably 60–85% by weight of ethylene; 5–49% by weight, preferably 7–45% by weight of α, β-unsaturated carboxylate; and 0.5–10% by weight, preferably 1–8% by weight of maleic acid anhydride. With the monomer composition of this range the resin composition having excellent mechanical strength such as toughness and superior fluidity can be obtained.

In the graft composite elastomer which is a vinyl monomer grafted composite elastomer of polyorganosiloxane and alkyl (meth) acrylate, (the component (c2)), if the amount of the polyorganosiloxane which constitutes the composite elastomer is greater than 99% by weight, the outward appearance of the molded product made from the resin composition will be impaired. If this proportion is less than 1% by weight, the impact strength of the molded product made from the resin composition is insufficient. Because of these reasons, the proportion of both of the two components (the rubber components) which make up the composite elastomer should be 1–99% by Weight, and preferably 5–99% by weight (on the sum of 100% by weight of the rubber components).

The polyorganosiloxane can be obtained by the method described, for example, in USP 2,891,920 or USP 3,294,725.

The composite elastomer comprising the polyorganosiloxane component and the polyalkyl (meth)acrylate component can be prepared by adding an alkyl (meth)acrylate, a cross-linking agent for the polyalkyl (meth)acrylate rubber, and a graft crossing agent for the polyalkyl (meth) acrylate rubber to a polyorganosiloxane latex to absorb these components in the polyorganosiloxane latex, and then polymerizing the mixture.

Acrylates of linear or branched alkyl group having 1–8 carbon atoms and alkyl methacrylates with the alkyl group having 6–12 carbon atoms can be given as the alkyl (meth)acrylates used for the preparation of the composite elastomer. Specific examples of these alkyl (meth)acrylates are methyl acrylate, ethyl acrylate, n-propyl acrylate, iso-propyl acrylate, n-butyl acrylate, iso-butyl acrylate, sec-butyl acrylate, 2-methylbutyl acrylate, 3-methylbutyl acrylate, 3-pentyl acrylate, hexyl acrylate, heptyl acrylate, 2-heptyl acrylate, octyl acrylate, 2-octyl acrylate, 2-ethylhexyl acrylate, hexyl methacrylate, octyl methacrylate, decyl methacrylate, lauryl methacrylate, 2-ethylhexyl methacrylate, and the like. Of these, butyl acrylate is preferred.

The graft composite elastomer (c2) used in the present invention has at least one vinyl monomer graft polymerized with the composite elastomer. Given as the examples of the vinyl monomer used here are methacrylates such as methyl methacrylate and 2-ethylhexyl methacrylate; acrylates such as methyl acrylate, ethyl acrylate, and butyl acrylate; aromatic alkenyl compounds such as styrene, halogen-substitued styrene, α-methylstyrene, and vinyl toluene; and cyanated vinyl compounds such as acrylonitrile and methacrylonitrile. These vinyl monomers may be used either individually or in combination of two or more of them.

Methyl methacrylate is preferably used among these vinyl monomers. The proportion of the composite elastomer and the vinyl monomers in the graft composite elastomer is 30–95% by weight and 5–70% by weight, respectively. More preferable proportion is 70–95% by weight of the composite elastomer and 5–30% by weight of the vinyl monomers. If the amount of the vinyl monomers is less than 5% by weight, dispersion of the grafted copolymer in the resin composition is insufficient; if this amount is more than 70% by weight, the impact strength tends to be lowered.

The amount of the component (C) which is the ethylenic terpolymeric elastomer (c1) and the graft composite elastomer (c2), which is a vinyl monomer grafted composite elastomer of polyorganosiloxane and alkyl (meth)acrylate, is 3–30% by weight, preferably 5–25% by weight, and particularly preferably 10–20% by weight, for 100% by weight of said PAS resin (A). If this amount is less than 3% by weight, the effects of this component, that is, the excellent toughness and fluidity, cannot be obtained. On the other hand, if the amount is more than 30% by weight, the rigidity, heat resistance, and flame retardancy may be impaired.

4. Mercaptosilane coupling agent (D)

There are no specific limitations to the mercaptosilane coupling agent (D) used in the present invention. Silane compounds having one or more —SH group and one or more Si—OR (R stands for an alkyl group) group can be given as examples. Here, as the alkyl group represented by R in the Si—OR group, alkyl groups having 1–20 carbon atoms can be given. Alkyl groups having 1–10 carbon atoms are particularly preferable. Specific examples of the mercaptosilane coupling agent (D) include γ-mercaptopropyltrimethoxysilane, γ-mercaptopropyltriethoxysilane, γ-mercaptopropylmethyldimethoxysilane, and the like.

The proportion of the mercaptosilane coupling agent (D) to be incorporated in the resin composition of the present invention is 0.1–5% by weight, preferably 0.15–3% by weight, and more preferably 0.2–2% by weight, of the total amount of the PAS resin (A), the silica (B), and said component (C) which is the ethylenic terpolymeric elastomer (c1) and/or the vinyl monomer grafted composite elastomer of polyorganosiloxane and alkyl (meth)acrylate (c2). If this proportion is less than 0.1% by weight, the strength of the resin composition is not sufficiently improved; if more than 5% by weight, gas may be produced and the outward appearance of the product may be impaired.

The mercaptosilane coupling agent may be added as the component (C) separately from the silica (B), or it is possible to treat the surface of silica (B) with the silane compound and to add this silica (B) treated with the silane compound.

5. Other components

Besides these components, other components may be optionally added to the polyarylene sulfide resin composition of the present invention to the extent that such addition does not interfere with the object of the present invention.

Such other components include, for example, various additives such as inorganic fillers, antioxidants, heat stabilizers, lubricants, colorants, and plasticizers; thermoplastic resins and/or thermoset resins such as polyamide, epoxy resins, silicone resins, silicone oils, silicone oils with various functional groups introduced therein, and polyolefin; rubbers such as hydrogenated SBS, hydrogenated NBR, silicone rubber, fluorinated rubber; and pigments.

Included in said inorganic fillers are, for example, oxides such as calcium oxide, magnesium oxide, titanium oxide, and aluminum oxide; hydroxides such as aluminum hydroxide, magnesium hydroxide, and calcium hydroxide; carbonates such as magnesium carbonate, calcium carbonate, and dolomite; sulfates such as barium sulfate, calcium sulfate, and magnesium sulfate; sulfites such as calcium sulfite; silicates such as calcium silicates; ceramics such as silicon carbide, silicon nitride, and boron nitride; whiskers such as calcium titanate whisker, alumina whisker, magnesia whisker, graphite whisker, silicon carbide whisker, zinc oxide whiskers of various forms; inorganic fibers such as glass fiber, aramide fiber, and carbon fiber; and other inorganic fillers, such as talc, clay, mica, glass beads, carbon black, diatomaceous, asbestos, and zeolite.

The amounts of these other components to be added can be suitably selected from the range not interfering with the object of the present invention.

6. Preparation of the polyarylene sulfide resin composition

The polyarylene sulfide resin composition of the present invention can be prepared by blending the PAS resin (A), the silica (B), the component (C) which is the ethylenic terpolymeric elastomer (c1) and/or the graft composite elastomer (c2), which is the vinyl monomer grafted composite elastomer of polyorganosiloxane and alkyl (meth)acrylate, the mercaptosilane coupling agent (D) and, optionally, the other components, and by melt kneading the mixture.

The melt-kneading can be carried out usually by a known method which can produce the target resin composition by homogeneously mixing and dispersing all the components in the resin.

A biaxial extruder or a uniaxial extruder can be suitably used for the melt-kneading.

There are no specific restrictions to the conditions under which the melt-kneading is carried out. It is, however, desirable to avoid extremely high temperatures and extremely long residence time in order to prevent decomposition or foaming of the optionally added components. A specific temperature range is usually 280°–350° C., and preferably 285°–330° C.

The polyarylene sulfide resin composition thus prepared is made into pellets or the like with a suitable shape and size by granulation or cutting, and directed to further processing, particularly it is made into the materials for molding with a metal mold or for injection molding.

In the polyarylene sulfide resin composition of the present invention in which the above-described four components are mixed at a specific proportion, the mercaptosilane coupling agent (D) used can increase the interface strength between the PAS resin (A) and the silica (B), thereby increasing the strength of the polyarylene sulfide composition without increasing the viscosity.

As illustrated above, the present invention provides a polyarylene sulfide resin composition which exhibits superior mechanical strength and high fluidity and can be used effectively for sealing ICs and various electronic parts.

EXAMPLES

The polyarylene sulfide resin composition of the present invention will now be described in more detail by way of examples.

Preparation of Pas 833 mols of sodium sulfide hydrate (Na₂S·5H₂O), 830 mols of lithium chloride (LiCl), and 500 l of N-methyl-2-pyrrolidone (NMP) were placed in a polymerization vessel equipped with a stirrer and heated at 145° C. under vacuum for one hour to dehydrate. After cooling the reaction system to 45° C., 905 mols of dichlorobenzene (DCB) was added and the mixture was polymerized at 206° C. for 3 hours. The resulting mixture was washed 5 times with hot water, once with NMP at 170° C., and three times with water, and dried at 185° C. to obtain linear PAS. The PAS had a melt viscosity of 10 Pa·S and contained 90 ppm of sodium.

Examples 1–5, Comparative Examples 1–6

The PAS resin and other components listed in Table 1 at the proportion shown in Table 1 were blended and melted at 290° C. to produce pellets.

The components other than the PAS resin used were as follows.

* Silica: Melt silica FB74 (trademark: manufactured by Denki Kagaku Kogyo, average particle diameter: 31.5 μm)
* Elastomer (c1): Bondine-AX8390 (trademark, manufactured by Sumitomo Chemical Industries, composition: ethylene, 68% by weight; ethyl acrylate, 30% by weight; maleic anhydride, 2% by weight)
* Elasomer (c2): Methablen S2001 (trademark, manufactured by Mitsubishi Rayon)
* Mercaptosilane coupling agent (γ-mercaptopropyl-trimethoxysilane): SH6062 (trademark, manufactured by Toray-Dow Corning Silicone)
* Epoxy silane coupling agent (γ-glycidoxypropyl-trimethoxysilane): SH6040 (trademark, manufactured by Toray-Dow Corning Silicone)
* Amino silane coupling agent (γ-aminopropyl-triethoxysilane): TSL8331 (trademark, manufactured by Toshiba Silicone)
* Vinyl silane coupling agent (vinyltriethoxysilane): TSL8311 (trademark, manufactured by Toshiba Silicone)

Evaluation of properties

Test leaves were prepared by molding molten pellets at a cylinder temperature of 290° C. and a die temperature of 135° C. The izod strength (conforming to ASTM D256) and bending property (conforming to ASTM D790) were measured. The results are shown in Table 1.

TABLE 1

| Components (wt. %) | Example 1 | Example 2 | Example 3 | Example 4 | Example 5 | Comp. Exam- ple 1 | Comp. Exam- ple 2 | Comp. Exam- ple 3 | Comp. Exam- ple 4 | Comp. Exam- ple 5 | Comp. Exam- ple 6 |
|---|---|---|---|---|---|---|---|---|---|---|---|
| PAS (A) | 42.5 | 42.5 | 45.0 | 42.5 | 36.0 | 45.0 | 42.5 | 42.5 | 42.5 | 42.5 | 42.5 |
| Silica (B) | 50.0 | 50.0 | 50.0 | 50.0 | 50.0 | 50.0 | 50.0 | 50.0 | 50.0 | 50.0 | 50.0 |
| Ternay copolymer elastomer (c1) | 7.5 | 7.5 | 5.0 | 4.0 | 7.5 | 7.5 | 7.5 | 7.5 | 7.5 | 7.5 | 7.5 |
| Grafted complex elastomer (c2) | 0 | 0 | 0 | 2.5 | 0 | 0 | 0 | 0 | 0 | 0 | 0 |
| Mercaptosilane coupling agent (D) | 0.25 | 0.50 | 0.50 | 0.50 | 0.50 | 0 | 0 | 0 | 0 | 0 | 0 |
| Epoxysilane coupling agent | 0 | 0 | 0 | 0 | 0 | 0 | 0 | 0.25 | 0.50 | 0 | 0 |
| Aminosilane coupling agent | 0 | 0 | 0 | 0 | 0 | 0 | 0 | 0 | 0 | 0.50 | 0 |
| Vinylsilane coupling agent | 0 | 0 | 0 | 0 | 0 | 0 | 0 | 0 | 0 | 0 | 0.50 |
| Melt viscosity (Pa · S) | 41 | 40 | 42 | 49 | 52 | 32 | 36 | 64 | 96 | 40 | 35 |
| Bending strength (MPa) | 60.3 | 66.4 | 64.8 | 71.5 | 68.4 | 39.0 | 37.7 | 59.0 | 68.0 | 39.0 | 34.2 |
| Izod strength | | | | | | | | | | | |
| Without notch (kJ/cm²) | 7.3 | 8.1 | 7.0 | 9.0 | 6.7 | 3.6 | 3.8 | 7.5 | 8.9 | 3.7 | 3.5 |
| With notch (kJ/cm²) | 1.6 | 1.6 | 1.7 | 1.8 | 1.5 | 1.3 | 1.5 | 1.5 | 1.6 | 1.3 | 1.4 |

The following findings were confirmed with the compositions of Examples and Comparative Examples.

The composition of Comparative Example 2, to which no silane coupling agent was added, exhibited a low bending strength and a low izod strength, although this composition had a low melt viscosity. By contrast, both the bending strength and the izod strength were improved in the compositions of Comparative Examples 3 and 4, to which the epoxy silane coupling agent (SH6040) was added, due to reinforcement of the interface between silica and the PAS resin. However, because the epoxy silane coupling agent (SH6040) reacts also with the acid anhydride which is present in the elasomer (AX8390), the melt viscosity of these compositions was significantly high. That is to say, the compositions of Comparative Examples 3 and 4 has a viscosity, respectively, of 64 Pa·S and 96 Pa·S, as compared with 36 Pa·S of the composition of Comparative Example 2. Such a large increase in the viscosity may cause fatal problems which depreciate the reliability of electronic parts with precise structures. In the compositions of Comparative Examples 5 and 6, to which a silane coupling agent which does not react with PAS was added, although the melt viscosity did not increase so much, the strengths did not increased either. This is evident from comparison of Comparative Examples 5 and 6 with Comparative Example 2.

In the compositions of Examples 1–3 in which the mercaptosilane coupling agent (SH6062), which does not react with the elastomer (AX3890) but reacts with PAS, was used, the strengths increased twice as high as the compositions of Comparative Examples 1 and 2 to which no silane coupling agent was added, while the melt viscosity remained as low as the viscosity of these comparative compositions. These results confirmed that it is possible to obtain a material having an excellent mechanical strength, which does not destroy precise structures and does not impair the reliability of electronic parts.

Industrial Applicability

As illustrated above, the polyarylene sulfide resin composition of the present invention exhibits excellent mechanical strength and high fluidity. The composition can be effectively used for sealing ICs and electronic parts.

I claim:

1. A polyarylene sulfide resin composition comprising:
   (A) a polyarylene sulfide resin,
   (B) silica,
   (C) (c1) a terpolymeric elastomer made from ethylene, an α, β-unsaturated carboxylate, and maleic acid anhydride, (c2) a graft composite elastomer which is a vinyl monomer grafted composite elastomer of polyorganosiloxane and alkyl (meth) acrylate, or a mixture of (c1) and (c2) and
   (D) a mercaptosilane coupling agent, and wherein the amounts of components (A), (B), (C) and (D) satisfy the following inequalities (I) to (IV), $0.15 \leq A/(A+B+C) \leq 0.60$     (I), $0.40 \leq B/(A+B+C) \leq 0.85$     (II), $0.03 \leq C/A \leq 0.30$     (III), and $0.001 \leq D/(A+B+C) \leq 5$     (IV)

and wherein said polyarylene sulfide resin (A) has a melt viscosity of 3–30 Pa·S at a resin temperature of 300° C. and a shear rate of 200 $S^{-1}$.

2. The polyarylene sulfide resin composition according to claim 1, wherein the sodium content in said polyarylene sulfide resin (A) is 150 ppm or smaller.

3. The polyarylene sulfide resin composition according to claim 1, wherein the silica (B) is melt silica and/or crystalline silica having an average particle diameter of 50 μm or smaller.

4. The polyarylene sulfide resin composition according to claim 1, wherein the monomer composition in said terpolymeric elastomer (c1) is 50–90% by weight of ethylene, 5–49% by weight of an α, β-unsaturated carboxylate, and 0.5–10% by weight of maleic acid anhydride; the elastomer composition in said composite elastomer of said graft composite elastomer (c2) is 1–99% by weight of polyorganosiloxane and 99–1% by weight of alkyl (meth) acrylate; and said graft composite elastomer (c2) is made up of 30–95% by weight of the composite elastomer and 5–70% by weight of the vinyl monomer.

5. The polyarylene sulfide resin composition according to any one of claims 1, wherein said mercaptosilane coupling agent (D) contains one or more —SH group and one or more Si—OR group, wherein R is an alkyl group.

* * * * *

UNITED STATES PATENT AND TRADEMARK OFFICE
CERTIFICATE OF CORRECTION

PATENT NO. : 5,604,287
DATED : February 18, 1997
INVENTOR(S) : Shinobu YAMAO

It is certified that error appears in the above-indentified patent and that said Letters Patent is hereby corrected as shown below:

On the title page, Item [86], the PCT information should read:

```
--PCT No.:         PCT/JP95/00443

§ 371 Date:      Nov. 17, 1995

§ 102(e) Date:   Nov. 17, 1995--
```

Signed and Sealed this

Eighth Day of July, 1997

Attest:

BRUCE LEHMAN

*Attesting Officer*  *Commissioner of Patents and Trademarks*